United States Patent [19]

Schuh

[11] 3,743,956

[45] July 3, 1973

[54] BRIDGE BIASING CIRCUIT FOR LINE POWERED AMPLIFIER

[75] Inventor: Peter Otto Sohuh, Indianapolis, Ind.

[73] Assignee: Bell Telephone Laboratories, Incorporated, Murray Hill, N.J.

[22] Filed: Jan. 20, 1972

[21] Appl. No.: 219,466

[52] U.S. Cl. ........................ 330/40, 330/17, 330/146

[51] Int. Cl. ............................................ H03f 3/04

[58] Field of Search ........................ 330/17, 40, 146, 330/149

[56] References Cited

UNITED STATES PATENTS 3,100,877 8/1963 Maupin .......................... 330/146 X

*Primary Examiner*—Roy Lake
*Assistant Examiner*—James B. Mullins
*Attorney*—W. L. Keefauver et al.

[57] ABSTRACT

A circuit for biasing a single stage line powered transmitter amplifier includes three resistance elements, which, when connected to the line, form an electrical bridge. By appropriately selecting resistance values, the bridge may be balanced, thereby providing a biasing voltage that is relatively independent of transmitter resistance and thereby enabling operation over longer line length. Additional economy is achieved by the use of two oppositely poled pairs of transistors connected in complementary Darlington configuration, in lieu of a conventional polarity guard. Depending on line polarity, one transistor pair is active, while the other is disabled by its bias.

7 Claims, 2 Drawing Figures

BRIDGE BIASING CIRCUIT FOR LINE POWERED AMPLIFIER

BACKGROUND OF THE INVENTION

1. Field of the Invention

This invention relates generally to line powered amplifiers (i.e., amplifiers wherein operating power is derived from the same line to which amplified output signals are applied) and, more particularly, to such amplifiers having an improved biasing circuit which enables operation with a variety of transmitter input resistances over relatively long line lengths, and with positive or negative line polarity.

2. Decription of the Prior Art

Line powered amplifiers are typically used in telephone applications to provide signal amplification for headset microphones or transmitters used in conjunction with jack-equipped telephones. Power is supplied to the amplifier from a remotely located central office over the same line which receives the amplified transmitter output. Because the line, or loop as it is called in telephone parlance, is often quite long and therefore necessarily high in resistance losses, care must be taken to properly adjust the amplifier bias for efficient operation. Since this adjustment must necessarily take account of the input resistance of the microphone or transmitter connected to the amplifier, once the adjustment has been made, it is not practical to change the type of transmitter being used. Stated differently, prior art amplifiers of the type described are not readily amenable to changes in input transducer resistance, which may often result in undesirable shifts in the amplifier bias point, at least in the case where long loops are employed.

Another problem associated with the use of prior art line powered amplifiers in the telephone field is the need for a polarity guard in order to enable proper circuit operation with either a positive or negative polarity line. This guard, which normally comprises four diodes connected in a bridge configuration, is quite costly, in relation to the other amplifier components, since germanium devices are generally necessitated by the low voltages available at the end of long loops. Additionally, the guard adds undesirably to the voltage drop in the amplifier.

In view of the foregoing problems, it is the broad object of the present invention to provide an improved biasing circuit for a line powered amplifier whereby input devices presenting different input resistances may easily be interchanged, without impeding proper operation over long loops.

An additional object of the invention is to provide a bipolar line powered amplifier that does not require a polarity guard.

Still further objects include the provision of such an amplifier that is more economical, from a manufacturing standpoint, than similar circuits now known, and that can provide more dynamic range and increased gain stability in comparison to practical prior art apparatus.

SUMMARY OF THE INVENTION

The foregoing and additional objects are achieved in accordance with one aspect of the present invention, by the provision in a line powered amplifier of an improved biasing circuit including three resistance elements which, when connected to a speech network and line (which act as a fourth resistance), form an electrical bridge. With proper choice of resistance values, the bridge can be balanced, and thus provide a biasing voltage across one of the bridge diagonals that is relatively independent of resistance changes of the transmitter connected across the remaining diagonal. Accordingly, the bias point of the amplifier is stabilized, despite changes in transmitter resistance, and the maximum loop length for which satisfactory amplifier operation is possible is increased.

In accordance with another aspect of the instant invention, the active portion of the foregoing line powered amplifier advantageously includes two pairs of oppositely poled transistors each connected in complementary Darlington configuration. Depending upon line polarity, one transistor pair is active, while the other is disabled by its bias, thus eliminating the need for a polarity guard. The active pair provides more open loop gain and correspondingly increased closed loop gain stability than would a conventional single transistor-polarity guard arrangement. Additionally, since the voltage drop caused by the polarity guard may be eliminated, relatively inexpensive silicon devices may be used while still improving dynamic range.

BRIEF DESCRIPTION OF THE DRAWING

The aforementioned and other features and advantages of the instant invention will become more readily apparent to persons skilled in the art by reference to the following detailed description, when read in light of the accompanying drawing, in which.

DETAILED DESCRIPTION

Figure 1:
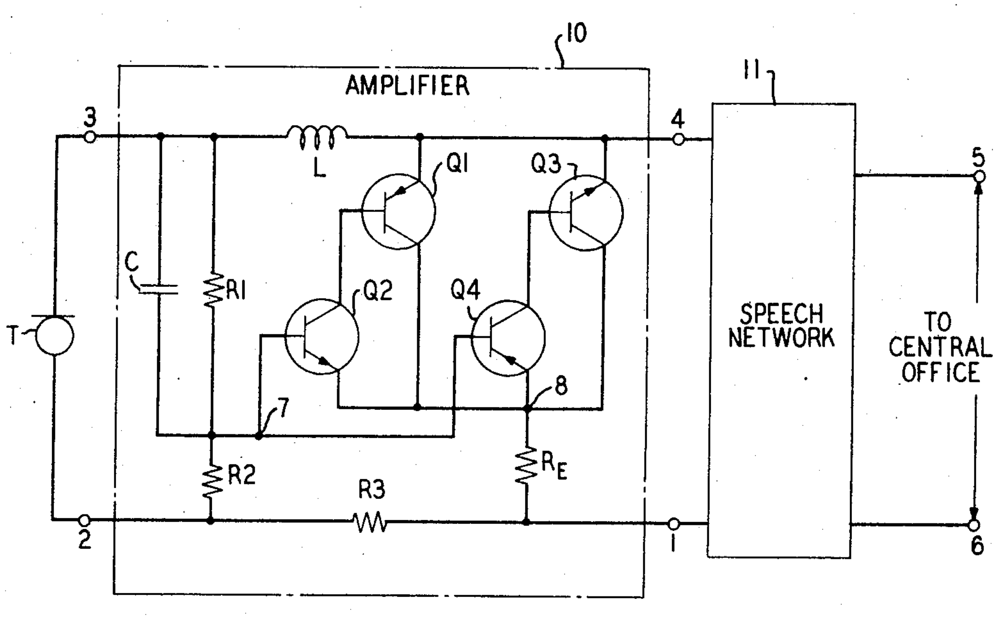
FIG. 1 is a circuit diagram of a complete line powered amplifier in accordance with the principles of the invention.

Referring now to FIG. 1, there is shown in schematic form a complete line powered amplifier 10 in accordance with the invention. When used in telephone applications, the amplifier has a transmitter T connected across its input terminals 2, 3, and one side of a conventional speech network 11 connected across its output terminals 1, 4. Power to operate amplifier 10 is derived from central office lines 5, 6, which are connected to the remaining side of network 11. In non-telephone applications, the line is connected directly across output terminals 1 and 4.

The active portion of amplifier 10 advantageously includes two pairs of oppositely poled transistors connected in complementary Darlington configuration. More specifically, the first pair comprises transistors Q1 and Q2, the collector and emitter terminals of transistor Q2 being connected to the base and collector terminals, respectively, of transistor Q1. Similarly, the second pair comprises transistors Q3 and Q4, the collector and emitter terminals of transistor Q4 being connected to the base and collector terminals, respectively, of transistor Q3. Transistors Q1 and Q4 are complementary to transistors Q2 and Q3, i.e., the former may be P-N-P and the latter N-P-N, or vice versa. The transistor pairs are arranged in parallel circuit relation by commonly connecting the base terminals of transistors Q2 and Q4 at point 7, the emitter terminals of transistors Q1 and Q3 at output terminal 4, and the emitter-collector terminals of transistors Q2, Q1 and Q4, Q3, respectively, at point 8. The "effective" collector electrodes of transistor pairs Q1, Q2 and Q3, Q4, are the emitter electrodes of transistors Q1 and Q3, respectively.

Bias for the transistor pairs is provided, in accordance with the invention, by three resistance elements R1, R2, and R3, which, when properly related to the resistance of network 11 and the central office loop, form a bridge circuit. More specifically, resistances R1 and R2, each forming a bridge arm, are connected in series across input terminals 3 and 2, and their common terminal is connected to the base terminals of transistors Q2 and Q4 at point 7. Resistance R3, the third bridge arm, is connected between the free terminal of resistance R2 and output terminal 1, terminal 1 also being connected to point 8 through a resistance element $R_E$ which acts as an emitter resistance for both transistor pairs. Input terminal 3 and output terminal 4 are connected together via an inductor L, and a capacitor C is connected across resistance R1, the purposes of which will be explained hereinafter.

Figure 2:
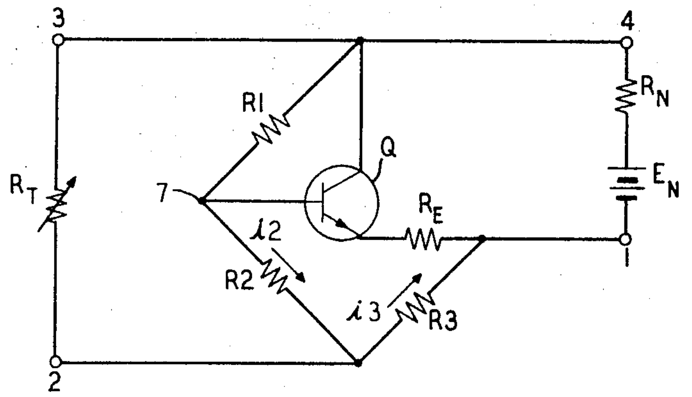
FIG. 2 is a simplified version of the circuit of FIG. 1, with only a single active element, for the purpose of illustrating amplifier biasing.

In order to fully appreciate the operation of the circuit of FIG. 1, the essential portions of that circuit, in terms of direct current operation, have been redrawn in FIG. 2, like elements retaining like designations. For simplicity, transistors Q1, Q2, Q3 and Q4 are replaced by a single active element (transistor Q), having emitter, base, and collector electrodes which correspond to the similarly named effective electrodes of one transistor pair. The resistance of transmitter T, which, of course, depends upon the particular type of transducer employed, is represented by variable resistor $R_T$. $R_N$ and $E_N$ represent the resistance and dc voltage, respectively, presented by network 11 and the central office loop at amplifier output terminals 1 and 4.

As can be seen in FIG. 2, the base-emitter junction of transistor Q, which controls the transistor bias point, is connected (with resistance $R_E$) across one bridge diagonal, while transmitter resistance $R_T$ is connected across the other diagonal. For the condition where $$R_1 \cdot R_3 = R_2 \cdot R_N \quad (1)$$

the bridge is balanced, and changes in the value of $R_T$ will not affect the transistor bias point. This proposition can be demonstrated in two ways: First, changes in $R_T$ (from a nominal value) can, by the compensation theorem, be represented by the insertion of a battery or dc potential in series with $R_T$. As is well known to those skilled in the art, variations in this potential, applied across the diagonal of a balanced bridge, do not appear across the remaining diagonal. Accordingly, variations in $R_T$ do not alter the bias of transistor Q. Second, transistor Q may be removed from the circuit, and a solution for the bias voltage $V_{7,1}$ between points 7 and 1 derived. With the transistor absent, $V_{7,1}$ is given simply by:

$$V_{7,1} = i_2 R_2 + i_3 R_3 \quad (2)$$

where:

$$i_2 = E_N - i_3 (R_N + R_3)/R_1 + R_2 \text{ and} \quad (3)$$

$$i_3 = E_N/R_N + R_3 + [(R_1 + R_2)R_T/R_1 + R_2 + R_T] \quad (4)$$

letting $$(R_1 + R_2)R_T/R_1 + R_2 + R_T = K \quad (5)$$

and substituting equations (3) and (4) in equation (2):

$$V_{7,1} = (R_2E_N/R_1+R_2) - [R_2E_N(R_N+R_3)/(R_1+R_2)(R_N+R_3+K)] + (E_NR_3/R_N+R_3+K) \quad (6)$$

HOwever, since the bridge is balanced, equation (1) applies, and the second term of equation (6) may be reduced to:

$$[E_N(R_2R_N+R_2R_3)/R_1+R_2(R_N+R_3+K)] = [E_N(R_1R_3+R_2R_3)/(R_1+R_2)(R_N+R_3+K)] = (E_NR_3/R_N+R_3+K) \quad (7)$$

so that equation (6) may be reduced to:

$$V_{7,1} = (R_2E_N/R_1+R_2) \quad (8)$$

Accordingly, the biasing voltage $V_{7,1}$ is seen to be independent of $R_T$, so that changes therein do not affect transistor operation.

Returning to FIG. 1, it can be seen that amplifier operation is enabled, in accordance with the invention, with either a positive or negative polarity line, 5, 6, by the advantageous use of oppositely poled pairs of transistors connected in complementary Darlington configuration. When line 5 is positive with respect to line 6 (terminal 4 positive with respect to terminal 1) transistors $Q_1$ and $Q_2$ are active, while transistors $Q_3$ and $Q_4$ are disabled by their bias. With line 5 negative with respect to line 6, the transistor action is reversed. The importance of the complementary Darlington configuration may be explained as follows. If only a single transistor ($Q_2$, $Q_4$) of each pair were used, the nonconducting transistor would undesirably load the conducting transistor, by virtue of the forward biased base-collector junction in the former. This loading effect would be obviated by the use of reverse biased diodes in series with the collectors of each disabled transistor. However, such a solution would lead, in the conducting transistor branch, to an undesirable voltage drop across the conducting diode, a loss which may be quite significant where low operating voltages are available at the end of long loops. This situation is remedied by the second transistor $Q_1$, $Q_3$, in each pair, which acts as a reverse biased diode in the nonconducting pair, and serves to improve amplifier gain and thus gain stability in the conducting pair.

The operation of the amplifier of FIG. 1 for ac signals will appear quite straightforward to those skilled in the art, and need not be further explained, once it is noted that inductance L serves to decouple the ac output from the ac input, and that capacitance C is provided to ac shunt resistance R1, thereby applying the ac input directly at the base terminals of transistors $Q_2$ and $Q_4$.

By way of example only, and not in any respect limiting the invention, the following component values and types may be employed to successfully practice the circuit of FIG. 1 with a line resistance of approximately 250 ohms:

$Q_1$, $Q_4$ = small signal silicon PNP transistor
$Q_2$, $Q_3$ = small signal silicon NPN transistor
$R_1$ = 8K ohms
$R_2$ = 2K ohms
$R_3$ = 62 ohms
$R_E$ = 27 ohms
L = 0.25 h, 35 ohms
C = 2.5 $\mu$f When constructed and tested, such an amplifier operated satisfactorily on loops up to 30 percent longer than would a prior art version, and was about 20 percent cheaper.

Many modifications and adaptations of this invention will readily become apparent to persons skilled in the art. For this reason, it is intended that the invention be limited only by the appended claims. For example, in certain situations, it may be desirable to slightly unbalance the bridge if, for example, transmitters with different resistances which are to be interchanged at the input terminals operate more efficiently at different points on the amplifier bias curve. Additionally, while the invention is primarily directed at telephone applications, it could be employed equally as well in other situations requiring a line powered amplifier.

What is claimed is:

1. A line powered amplifier comprising:
first and second input terminals,
first and second resistances connected in series between said input terminals,
an active portion including a first transistor having a base electrode, an emitter electrode, and a collector electrode,
a third resistance,
first and second output terminals for connecting said amplifier to a line having a fourth resistance,
first means for connecting said base electrode to the common terminal of said first and second resistances,
second means for connecting said emitter electrode to one terminal of said third resistance,
third means for connecting the free terminal of said third resistance to the free terminal of said second resistance,
fourth means for connecting said first output terminal to said first input terminal,
fifth means for connecting said collector electrode to said first output terminal, and
sixth means for connecting said second output terminal to said emitter electrode,
wherein the product of said first and third resistances is substantially equal to the product of said second and fourth resistances.

2. The invention defined in claim 1 wherein
said active portion further includes second, third, and fourth transistors each having base, emitter and collector electrodes,
said second and third transistors are of a type complementary to said first and fourth transistors,
said fifth means includes the base-emitter junction of said second transistor, said collector electrode of said second transistor is connected to said emitter electrode of said first transistor, and
said third and fourth transistors are connected in complementary Darlington configuration in parallel with said first and second transistors and arranged to operate when the polarity of said line is such as to disable said first and second transistors by their bias.

3. The invention defined in claim 2 wherein
said fourth means includes an inductance for decoupling said first output terminal from said first input terminal,
said amplifier further includes a capacitor in parallel with said first resistance, and
said second means includes an emitter resistance.

4. In a line powered amplifier comprising:
a pair of input terminals for connecting said amplifier to an input transducer having a variable resistance,
an active portion including at least a first transistor having base, collector and emitter electrodes for amplifying the output of said transducer, and
a pair of output terminals for connecting said amplifier output to a line having a resistance, said line supplying power to said amplifier,
means for biasing said active portion for operation independent of variations in said input transducer resistance,
said biasing means comprising three resistance elements connected with said line resistance to form a balanced bridge,
said transducer resistance being connected across one diagonal of said bridge and the emitter-base junction of said active portion being connected across the remaining diagonal of said bridge.

5. The invention defined in claim 4 wherein
said active portion further includes second, third and fourth transistors, said first and fourth transistors being complementary to said second and third transistors,
said first and second transistors being connected in complementary Darlington configuration to form a first pair,
said third and fourth transistors being connected in complementary Darlington configuration to form a second pair in parallel relation to said first pair, and
said first pair being operated when said second pair is disabled by its bias.

6. In a line powered amplifier including an active portion having biasing terminals, said active portion amplifying signals generated by a transducer of resistance $R_T$ and supplying said amplified signals to a line of resistance $R_N$, means for biasing said active portion with a voltage substantially independent of $R_T$, said means comprising:
first, second and third resistances connected to said line resistance $R_N$ to form a balanced electrical bridge having first and second diagonals,
means for connecting said transducer across said first bridge diagonal, and
means for connecting said biasing terminals across said second bridge diagonal.

7. The invention defined in claim 6 wherein said active portion comprises:
first, second, third and fourth transistors, said first and fourth transistors being of a type complementary to said second and third transistors, said first and second transistors being connected in complementary Darlington configuration to form a first pair, said third and fourth transistors being connected in complementary Darlington configuration to form a second pair in parallel relation with said first pair, and said first pair operating when said second pair is disabled by its bias.

* * * * *